United States Patent [19]
Balzano

[11] Patent Number: 5,101,403
[45] Date of Patent: Mar. 31, 1992

[54] APPARATUS FOR PROCESSING SIGNALLING MESSAGES IN AN ASYNCHRONOUS TIME DIVISION TELECOMMUNICATIONS NETWORK

[75] Inventor: Jean-Michel Balzano, Perros Guirec, France

[73] Assignee: Alcatel Cit, Paris, France

[21] Appl. No.: 501,222

[22] Filed: Mar. 29, 1990

[30] Foreign Application Priority Data

Mar. 30, 1989 [FR] France .................... 89 04168

[51] Int. Cl.$^5$ .................... H04L 1/00; H04L 5/22; H04L 25/30
[52] U.S. Cl. .................... 370/58.2; 370/110.1; 395/800; 364/DIG. 1
[58] Field of Search .................... 370/17, 58.2, 110.1, 370/60, 60.1, 94.1, 94.2; 364/200, 900, DIG. 1; 395/800

[56] References Cited

FOREIGN PATENT DOCUMENTS 0300942 1/1989 European Pat. Off.
0301934 2/1989 European Pat. Off.

OTHER PUBLICATIONS

IEEE/IEICE Global Telecommunications Conference 1987, Conference Record, Tokyo, Nov. 15-18, 1987, vol. 3, pp. 2095-2099, IEEE, New York, U.S.; T. Ae et al., "A design of high speed network controller".
IEEE Network, vol. 3, No. 1, Jan. 1989, pp. 17-22, IEEE, New York, U.S.; M. J. Rider: "Protocols for ATM access networks".

Primary Examiner—Douglas W. Olms
Assistant Examiner—Melvin Marcelo
Attorney, Agent, or Firm—Sughrue, Mion, Zinn, Macpeak & Seas

[57] ABSTRACT

The apparatus comprises a protocol processor circuit connected to a network, a memory having a transmit memory and a receive memory, a transmit control memory and a receive control memory. The memories are connected to the processor circuit via a data bus and to a level 2.2 processor by a bus. The control memories are of the FIFO type, with the transmit control memory being written to by the high level 2.2 processor and being read from by the processor circuit, and with the receive control memory being written to by the processor circuit and read from by the level 2.2 processor. The processor circuit transmits and receives cells containing signalling information, and it performs level 2.1 function of the protocol: detecting transmission errors on a cell-by-cell basis, detecting loss for added cells, splitting up a message delivered by the level 2.2 processor into cells, and de-interlacing cells relating to a plurality of messages on reception.

6 Claims, 2 Drawing Sheets

APPARATUS FOR PROCESSING SIGNALLING MESSAGES IN AN ASYNCHRONOUS TIME DIVISION TELECOMMUNICATIONS NETWORK

The present invention relates to data communications and in particular to the processing of signalling in a communications protocol particularly adapted to asynchronous time division (ATD for short) and more particularly it relates to processing errors in signalling messages.

BACKGROUND OF THE INVENTION

While being conveyed through a communications network, transmitted data is subjected to various disturbances that may give rise to an error rate which is incompatible with the required quality of transmission. In order to mitigate this phenomenon, a transmission protocol is used based, in most cases, on splitting up the transmitted data into fragments, in detecting when a received fragment includes errors, and in requesting retransmission thereof.

In the open system interconnection (OSI) standard, which defines seven layers for data interchange between systems, sublayer 2.1 relates to error detection, and it serves to split up and reassembled data in frames, and to detect errors in frames. Existing methods and apparatuses which process sublayer 2.1 in the HDLC protocol, for example, are adapted to processing a continuous flow of data which appears at an input; they therefore make use of a method of splitting up data which is specific thereto: delimiting frames by adding a known pattern to the beginning and the end of each frame, which pattern is "01111110" for HDLC; and in systematically injecting a "0" each time five consecutive "1s" are recognized within a frame so as to avoid imitating frame-delimiting patterns.

These existing methods and apparatuses are not well adapted to asychronous time division because of the following features specific thereto:

the data is naturally split up in the form of cells comprising 36 bytes, for example (of which 32 constitute useful data), with the cells being delimited in known manner; and after passing through a network, cells belonging to a large number of different calls are interlaced. Using existing apparatuses would therefore require data to be split up in redundant manner and would also require data to be de-interlaced prior to processing.

The object of the invention is to mitigate the drawbacks of these prior solutions and to enable high transfer rates to be used with asynchronous time division signalling messages by enabling the protocol of the layer 2.1 to operate using a minimum number of bytes in a cell.

SUMMARY OF THE INVENTION

The present invention provides apparatus for processing signalling messages in an asynchronous time division telecommunications network in which information of all kinds is interchanged by means of cells using a communications protocol adapted to asynchronous time division, each cell being preceded by a header which includes a virtual circuit number, said signalling messages being interchanged between control stations connected to the telecommunications network and being exploited within control stations by a processor for processing a higher level of the communications protocol called level 2.2 wherein the apparatus is implanted in each control station for connecting the station to the telecommunications network, wherein it includes a processor for processing level 2.1 of the communications protocol connected to the telecommunications network, a memory, a transmit control memory, a receive control memory, a data bus connected to the processor circuit, to the memory, and to the control memories, an address bus connected to the processor for processing level 2.1 and to the memory, and a third bus connected to the memory, to the control memories, and to the said higher level processor, and wherein the protocol processor for processing level 2.1 peforms level 2.1 functions of the protocol: detecting transmission errors cell-by-cell, detecting lot or added cells, splitting up a signalling message from the higher level processor into cells, and de-interlacing cells on reception belonging to a plurality of different signalling messages.

The apparatus of the invention is based on a protocol whose level 2.1 error detection layer is based on the cell used in ATD. This makes it possible:

to split and reassemble signalling messages to be transmitted in the form of cells; messages may be large in size (4 Kbytes) compared with the size of cells in order to enable high transfer rates, e.g. about 15 Mbit/s;

to detect errors on a cell-by-cell basis, by using a 16 bit cyclic redundancy check relating to the useful data in each cell;

to detect the loss of or addition of cells by using a sequencing counter which is incremented by each new cell in a call; in the event of overload, it can happen that an ATD network loses or adds cells without warning the user; and to de-interlace the signalling cells of different calls.

only messages which are correct and complete, i.e. without error, and without the loss of or the addition of any cell, are forwarded to higher levels. The apparatus is capable of processing 2048 simultaneous calls, each corresponding to a different virtual circuit number.

BRIEF DESCRIPTION OF THE DRAWINGS

An embodiment of the invention is described by way of example with reference to the accompanying drawings, in which.

DETAILED DESCRIPTION

Figure 1:
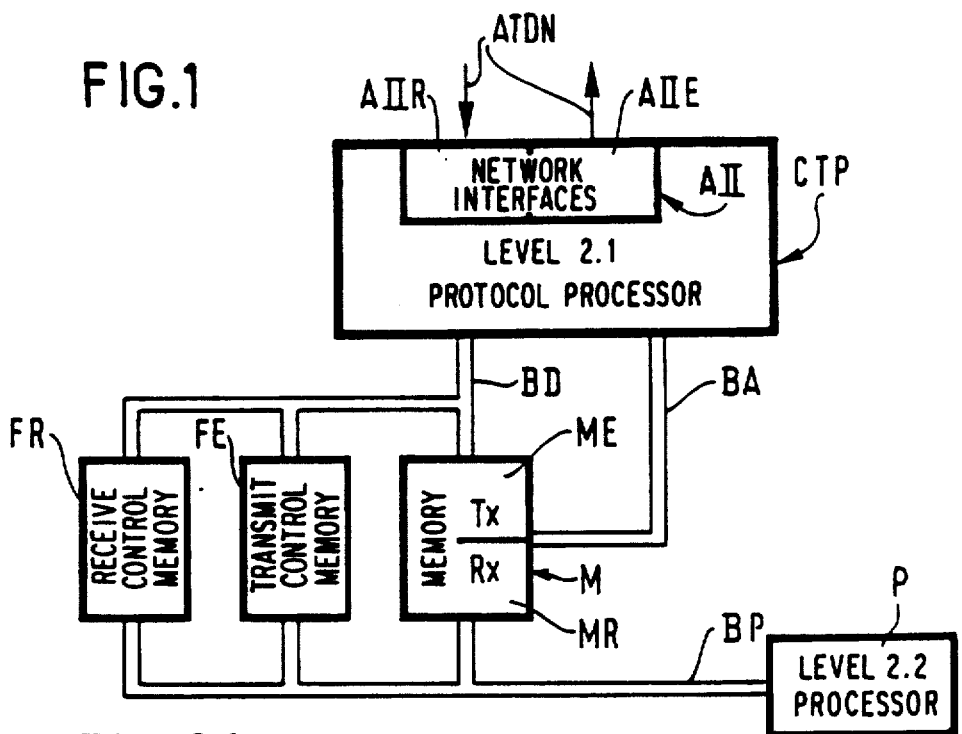
FIG. 1 is a block diagram of apparatus in accordance with the invention.

FIG. 1 is a diagram showing apparatus of the invention processing level 2.1 of the protocol internal to an asynchronous time division network ATDN. The apparatus comprises a protocol processing circuit CTP, a memory M, a transmit control memory FE, and a receive control memory FR. The processor CTP is a network of programmable logic cells, for example constituted by the XC 3090 component provided by the firm XILINX The processor CTP is provided with an interface cell AII constituted by a transmit interface AIIE and a receive interface AIIR, each connected to the network ATDN and enabling cells to be transmitted and received. The memory M is a two-port random access memory (RAM) organized as 32,000 16-bit words, and including a transmit memory portion ME and a receive memory portion MR.

The memory M constitutes a buffer in which messages are stored, with the two ports serving to overcome problems of bus allocation in such a manner as to optimize interchange speeds between the processor CTP and a level 2.2 processor P with which the memory M is connected via a bus BP. The transmit and receive control memories FE and FR are of the FIFO (first-in, first-out) type enabling dialog to take place between the processor CTP and the level 2.2 processor P. Each of these memories FE and FR is constituted by 16-bit words. The memory M and the control memories FE and FR are connected to the processor CTP by a data bus BD. The control memories are also connected to the bus BP. The memory M is also connected to the processor CTP an address bus BA.

Figure 2A:
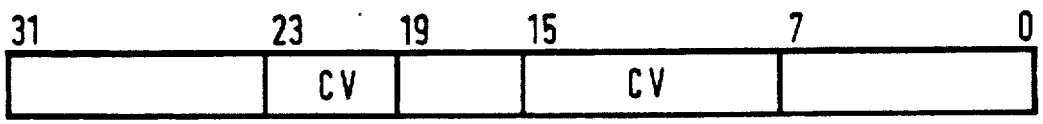
FIGS. 2A and 2B show respectively the header and the useful contents of a cell.

Each communication cell comprises 36 bytes, i.e. four header bytes and 32 useful bytes. FIG. 2A shows a header which comprises 12 bits for the virtual circuit number CV identifying the call to which the cell belongs; with the virtual circuit number being contained in bits 8 to 15 and in bits 20 to 23, referenced CV. The remaining 16 bits, 0 to 7, 16 to 19, and 24 to 31 include a field for detecting and correcting errors in the header and various bits which are independent from the present application.

Figure 2B:

FIG. 2B shows the useful contents of a communication cell, which comprises:

a control byte CTRL having;
 a beginning-of-message flag bit D;
 an end-of-message flag bit F;
 a flag Ip indicating the presence of a L byte; and
 five bits N for numbering the cell, modulo 32;
and L byte indicating the useful length of the information in a field INFOS;
an information field INFOS for supporting the higher layers; and
two CRC bytes for performing a cyclic redundancy check on the 32 bytes of the cell, with the generator polynomial being: $X^{16}+X^{12}+X^5+1$.

When the Ip bit is use, it is processed by the processor circuit CTP and it indicates:

for Ip=1, the byte which follows the byte CTRL is the L byte which indicates the number of useful bytes in the field INFOS which has a maximum of 28 useful bytes; or for Ip =0, the byte following CTRL is itself an information byte, in which case there are 29 useful bytes in the field INFOS.

Otherwise, the unused Ip bit is set to 1 on transmission and is not read on reception, with the byte following the byte CTRL always being a length byte, even when the field INFOS is fully utilized.

The apparatus shown in FIG. 1 processes both transmission directions for 2048 virtual circuits: to do this, it processes only the 11 least significant bits of the virtual circuit number.

In the transmit direction, the apparatus includes two interfaces: and interface with the level 2.2 processor P constituted by the transmit memory Me capable of being written to or read from simultaneously by the processor CTP and by said level 2.2 processor P, and the transmit control memory FE; and the transmit interface AIIE of the processor circuit CTP.

Figure 3:
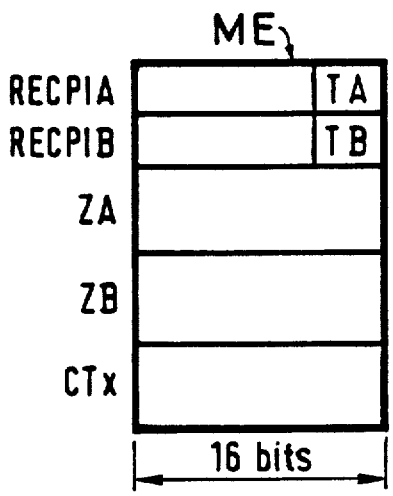
FIG. 3 represents the transmit memory of the FIG. 1 apparatus.
Figure 4:
FIG. 4 shows a transmit context of the transmit memory.

The transmit memory ME which is shown diagrammatically in FIG. 3 is constituted by 16-bit memory words and comprises two main portions:

a data portion split into two zones ZA and ZB in which messages for processing and transmitting are stored, each zone is of sufficient size to receive a maximum length message, 4 Kbytes; and a transmit context portion CTx used for numbering the transmitted cells, in field N of the control byte CTRL; there exists one transmit context per virtual circuit processed, i.e. a total of 2048 contexts, with a transmit context being constituted by a 16-bit work (FIG. 4) of which only bits 0 to 4 are used, which five bits (referenced cell No.) specify the number of the cell to be transmitted, thereby constituting a modulo-32 cell counter; and two registers RECPIA and RECPIB, each comprising one memory word and each containing only one bit TA or TB which is used, which words are written to by the processor circuit CTP and read from by the level 2.2 processor P, with the bit TA or TB being set to 1 by the circuit CTP after transmitting a message contained in the corresponding zone ZA or ZB.

A message is transmitted as follows; the level 2.2 processor P writes the full message to be processed in a free one of the two zones ZA or ZB of the transmit memory, and it then writes a 4-byte command in the transmit control memory FE, said command being shown in FIG. 5 and indicating:

CV in bits 0 to 10, representing the number of the virtual circuit over which the message is to be transmitted (with this number being written in the header of each cell of the message);

Noct in bits 16 to 27 specifying the number of 8-bytes in the information field of the message;

z, in bit 28, the zone ZA (A=0) or ZB (Z=1) in which the message to be transmitted is stored;

I, in bit 29, to indicate that the circuit CTP must send an interrupt to the the level 2.2 processor in order to indicate the end of transmission (i.e. the entire message has been transmitted), in any event, the processor CTP sets the bit TA or TB of the register RECPIA or RECPIB;

T in bits 30 and 31, specifying the type of the command, and reserved for subsequent use; and bits 11 to 15 are unused.

Figure 5:
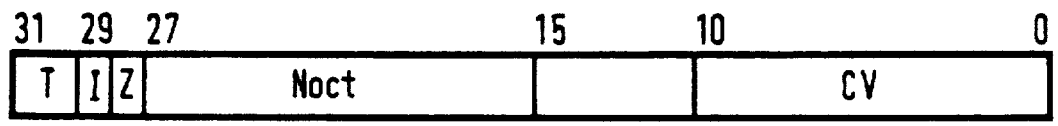
FIG. 5 shows a command in a transmit control memory.

The transmission processing algorithm is as follows:

the processor CTP regularly scans the state of the transmit control memory FE, and whenever this memory is not empty, the circuit performs the following operations:

it reads the command in the transmit control memory FE;

it initializes a counter in the circuit CTP specifying the number of bytes left to be transmitted, together with the number of bytes Noct contained in the command;

it transmits the header of the first cell in the message over the ATD network, this transmission comprises four bytes (FIG. 2A) including the virtual circuit No. CV provided by the command (FIG. 5);

it sends the control byte CTRL (FIG. 2B):

DF = "10" if this is the first cell of a message, and if the byte counter is greater than 28;

DF="00" if this is an intermediate cell and if the byte counter is greater than 28;

DF="01" if this is the last cell of the message and if the byte counter is less than or equal to 28;

DF="11" if this is the first cell of the message and if the byte counter is less than or equal to 28 (the message contains only one cell);

in the above description, Ip is not used, in which case it is systematically set to 1 on transmission;

it reads the cell counter (FIG. 4) in the transmit memory context ME corresponding to the virtual circuit indicated by the command;

it updates the transmit memory of the context corresponding to the virtual circuit by writing therein the number of the next cell to be transmitted, with this updating consisting in incrementing the cell counter;

it sends the length byte L which is copied form the byte counter if F=1 (end-of message) and which has the value 28 if F=0;

it reads 28 bytes from the zone of the transmit memory in which the message is stored, said zone being specified in the command by the bit Z, and it sends these bytes via the transmit interface AIIE;

it sends the two cyclic rebundancy check bytes CRC, with said check being calculated running over the 32 useful bytes of the cell; and it continues to send cells until the byte counter is exhausted, whereupon:

it sets the bit TA or TB in the register RECPIA or RECPIB to "1" and, if so specified in the command, it sends an interrupt to the level 2.2 processor; and it rescans the state of the transmit control memory FE.

The counter for counting the bytes to be transmitted which was initialized in the processor CTP after reading the command in the transmit memory FE, is decremented by unity each time an information byte is transmitted to the network ATDN (with the informaiton byted being taken from the transmit memory).

On reception, the apparatus of the invention also has two interfaces:

an interface with the level 2.2 processor P constituted by the receive memory MR, in the form of a two-port RAM type memory capable of being written to or read from simultaneously by the processor CTP and by the level 2.2 processor P, together with the receive control memory FR; and the receive interface AIIR of the processor circuit CTP.

Figure 6:
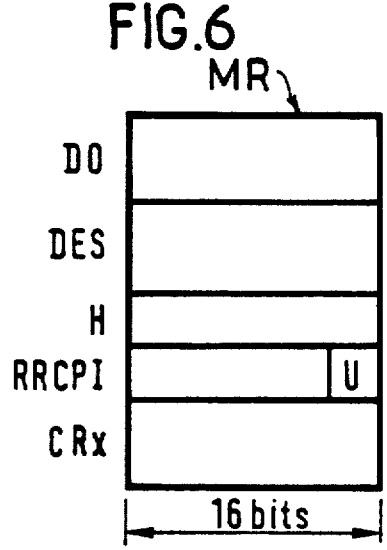
FIG. 6 shows the receive memory of FIG. 1.

The receive memory MR, shown diagrammatically in FIG. 6, is constituted by 16-bit memory words and comprises three main portions:

a data portion DO split up into zones of 28 bytes or 29 bytes if Ip is in use, depending on whether the field INFOS in each cell contains 28 bytes or 29 bytes, with the data portion comprising 1407 zones;

a descriptor portion DES containing all of the descriptors associated with the preceding zones, each zone being associated with a 4-byte zone descriptor; and a receive context portion CRx used for sequencing cells and for identifying the first zone of a message received over a virtual circuit, each virtual circuit processed is associated with a 4-byte received context, and since the apparatus of the invention processes 2048 virtual circuits, the size of the received context portion CRx is therefore 8192 bytes; and in addition to the three above-mentioned main portions, the receive memory MR also includes:

a register RRCPI which is a memory work in which a bit U informs the level 2.2 processor of possible overflow in the receive memory MR (U=1); and a memory word which is a clock count register H.

Figure 7:
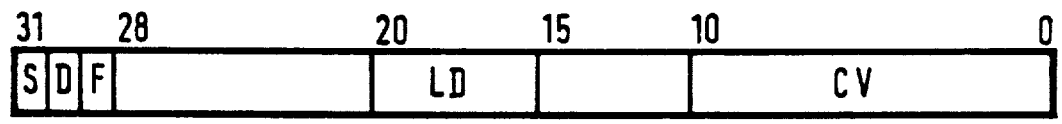
FIG. 7 shows a descriptor of the receive memory.

FIG. 7 shows the structure of a 4-byte zone descriptor, each descriptor occupying two words of the receive memory MR. This structure comprises:

CV, on bits 0 to 10, indicating the number of the virtual circuit over which the contents of the zone corresponding to the zone descriptor was received;

LD, on bits 16 to 20, constituting the length of the data, for indicating the number of useful bytes stored in the zone associated with the descriptor;

F, on bit 29, for indicating that the zone contains the end of a message;

D, on bit 30, for indicating that the zone contains the beginning of a message;

S, on bit 31, for indicating the state of the zone which is free or "signalled", when "signalled" this means the first zone in which the beginning of a full message has been received and whose arrival has been signalled to the level 2.2 processor; and bits 11 to 15 and 21 to 28 are unused.

Figure 8:
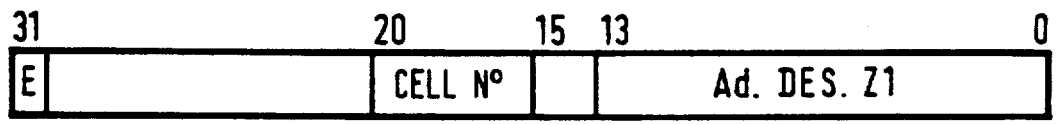
FIG. 8 shows the structure of a receive context in the receive memory.

FIG. 8 shows the structure of a receive context, which comprises:

Ad.DES.Z1 in bits 0 to 13, comprising the 14 most significant bits of the address of the first work of the zone descriptor contained in the beginning of the message;

cell No., on bits 16 to 20, being the number of the next cell expected in a multicell message being received; and E on bit 31 for indicating when E=1 that a message comprising a plurality of cells is being received on the virtual circuit corresponding to the receive context.

The data portion DO and the descriptor portion DES of the receive memory MR is managed as a circular buffer. The zone at the top of the buffer and the corresponding zone are each marked by a respective current pointer situated inside the processor CTP and which is constituted by the address of the first memory work in each of said portions. Each time information from a cell is stored, the value of the current zone pointer is incremented by 14 and the value of the current descriptor pointer is incremented by 2 (with each memory word being constituted by a 16-bit word).

The processing algorithm on reception is the following:

From the receive interface AIIR, the processor CTP reads the header of a received cell and it stores internally the virtual circuit number CV (see FIG. 2A, cell header), it reads the control byte CTRL, and the length byte L (see FIG. 2B, contents of a cell) where necessary.

In the receive memory MR, the circuit CTP reads the receive context associated with the received virtual circuit and the descriptor associated with the data zone indicated by the current pointer.

Four possible operating cases can be distinguished, depending on the values of the bits D and F and of the control byte CTRL.

The skeleton common to all four operating cases is as follows:

bit E of the receive context is compared with the bits D and F of the received cell in order to detect possible sequencing errors:

error type 1, when beginning cell arrives (D=1) whereas a subsequent cell (D=0, F=0) for E=1, or else an end cell was expected (D=0, F=1); or a type 4 error, namely a following cell has arrived (D=0, F=0) or an end cell has arrived (D=0, F=1) whereas a beginning cell was expected (D=1) while E=0;

the number of the receive cell N (which number is contained in five bits of the control byte CTRL) is compared with the expected number (cell No.) written in the received context, in order to detect the loss of cells in a long message, error type 2. The value of the expected cell number (cell No.) is reinitialized each time a beginning cell of a long message is received (D=1, F=0), and it is updated each time a following cell is received (D=0, F=0).

The value of the number cell No. is not taken into account when there is only one cell, i.e. D=1 and F=1.

The bits S and D of the descriptor for the current zone as indicated by the current zone pointer are analyzed in order to determine whether it is possible to occupy the zone:

S=0, D=0 zone busy
S=0, D=1 zone busy
S=1, D=0 zone busy
S=1, D=1 zone unoccupied, abandon the cell, error type 3.

Figure 9:
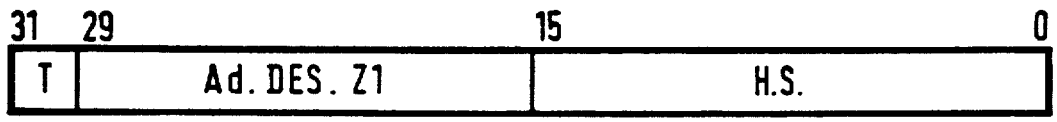
FIG. 9 shows a command in a receive control memory.

If the zone is busy, the INFOS portion of the received cell is stored in the current zone, the virtual circuit number CV of the zone descriptor (bits 0 to 16) is updated, and the current zone and descriptor pointers are incremented;

the value of the cyclic redundancy check CRC of the receive cell is analyzed in order to detect bit errors in the cell (error 5);

the zone descriptor, i.e. bits S, D, F, and LD, is updated in the receive context associated with the virtual circuit of the receive cell, with bit E, and bits 0 to 13, Ad.DES.Z1 giving the addresses of the first word of the zone descriptor containing the beginning of the message if the cell is the first cell of the message, of the memory word RRCPI, and of the clock counter H;

if the cell contains the end of the message, F=1, and if there has been no error:

the bit S of the zone descriptor containing the first cell of the message is set to "1" to mark this zone, when the message has only one cell, D=1 and F=1 and the descriptor is the current zone descriptor, and when the cell is an end cell, D=0, F=1, the address of the zone containing the first cell is given in the context; and a command, whose format is given in FIG. 9, is sent by the circuit CTP to the receive control memory FR.

The command (FIG. 9) occupies four bytes and comprises:

HS on bits 0 to 15, being the time of signalling: this is the time at which the command was sent, which time is given by the clock count register H of the receive memory MR at the moment of transmission;

Ad.DES Z1, on bits 16 to 29, these are the 14 least significant bits of the address of the first word of the zone descriptor containing the beginning of the message; and T, on bits 30 and 31, specifying the type of the command, reserved for subsequent use and at present these bits are set to "11".

Apart from a type 1 error, the message currently being received is abandoned for any other type of error and is not transmitted to the level 2.2 processor. After an error, processing is as follows: bit E in the receive context associated with the virtual circuit of the receive message (or cell) is reset to zero in order to enable the beginning of a subsequent message to be received on the same virtual circuit without giving rise to an untimely error, and bit 0 in the descriptor of the first zone of the message currently being received is set to 0 in order to release this zone. However, in the event of a cyclic redundancy check error, error 5, the data zone is indeed occupied since the error is detected only after the cell has been stored in the data portion DO of the receive memory MR. Otherwise the cell is not stored in the receive memory and the current zone and descriptor pointers are not incremented.

When reading a descriptor whose bit S=0 and whose bit D=1 (i.e. a zone containing the beginning of a message for which the end has not yet been received, or has been lost), the zone is seized. However, it is necessary to reset the bit E to 0 (indicating that a long message is being received) in the receive context of the message previously contained in said zone in order to be able to receive a new message over the virtual circuit that was occupied by said zone. The descriptor contains the number of the virtual circuit, thereby making it possible to find the receive context associated with the virtual circuit, in order to reset the bit E therein to 0.

The combination S=1 and D=0 is not used; the zone is considered as being free.

The data portion DO of the receive memory MR is read at the rate of the level 2.2 processor P. This processor scans the receive control memory FR whenever it goes from being empty to being not empty, and thereafter it scans the memory each time a message is read until it finds that the receive control memory is empty.

The level 2.2 processor P reads a message as follows:

the command being received (FIG. 9) is read in the receive control memory FR;

the descriptor of the zone containing the beginning of the message whose address (Ad.DES.Z1) is given by the command is read so as to gain access to the number of the virtual circuits of the circuits to be read, said number being given by the bits 0 to 10, CV, of the zone descriptor;

when receiving a single cell message, D=1, F=1, and the zone corresponding to the descriptor is read; otherwise when the message is a long message, D=1, F=0, and descriptors having the same virtual circuit number from the first zone are scanned until the descriptor is found for the zone having F=1, which is the last descriptor of the message, after which the data zones corresponding to the descriptors are made use of.

A clock is also available in the receive memory MR. This comprises a memory word H which operates as a 16-bit clock and which is incremented by the circuit CTP at each cell time. When signalling a message, the current time is written into the command, in bits HS thereof, see FIG. 9. When the level 2.2 processor comes to read the receive control memory FR, it will be able to determine the age of the message by comparing the time given by the command and the current time. This makes it possible, for example, to avoid processing messages which are too old.

The five types of error specified above require the following actions to be taken:

Error 1: loss of the end of the preceding message on the same virtual circuit. Reset flag D of the descriptor for the first zone 0 in order to purge the message, the address of this descriptor is indicated in the receive context of the virtual message.

Error 2: the loss of one or more subsequent cells in the current message, or the loss of the end of the preceding message in the beginning of the current message. Reset the (ongoing message) flag E to 0 in the receive context relating to the virtual circuit and reset the flag D of the descriptor for the first zone 0 in order to purge the message.

Error 3: overflow of the receive memory MR has been detected (bit U in the word RRCPI). Purge the current message by resetting the flag D to 0 in the descriptor for the first zone, and the resetting the flag E (ongoing message) to 0 in the receive context of the virtual circuit, if necessary. Do not increment the current zone and descriptor pointers.

Error 4: loss of the beginning of the current message. Abandon the cell received and do not increment the pointers.

Error 5: cyclic redundancy check error (CRC). Reset the flag D in the first zone descriptor to 0, and also reset the flag E in the receive context to 0 if this is a subsequent cell, in order to purge the message.

Each time the flag D of a zone descriptor is reset to 0, the flag S of said descriptor is also reset to 0 in order to avoid any possibility of the configuration $S=1, D=0$ persisting in the receive memory MR.

In the transmit direction, when there is no message to be processed (end of transmitting the current message and the transmit control memory FR is empty), the processor CTP must zero the cell present signal in the transmit portion of the interface AII. The bytes transmitted over the network ATDN are set to "1".

In the receive direction, when the cell-present signal indicates an empty cell, the circuit CTP must inhibit all accesses to the receive memory MR and to the receive control memory FR concerning said cell, apart from accesses by the time counter H which is incremented in the normal manner. The processor CTP must also inhibit incrementation of the zone and the descriptor pointers.

The processor CTP must provide an interrupt to the level 2.2 processor P under the following two conditions:

end of transmitting a message with bit I in the message transmit command (FIG. 5) being set to "1"; and overflow of the receive memory MR (reading a descriptor for which both the bits S and D are at "1").

The level 2.2 processor P can identify the source of the interrupt by reading memory words RECPIA, RECPIB, and RRCPI.

The processor CTP receives an external level clock at a nominal frequency Fo of 15.6 MHz, for example. After being divided by 8, this clock is used for reading bytes from the network ATDN.

The receive portion of the interface AII delivers a cell synchronizing signal which is used for synchronizing:

the divide by 8 circuit in order to obtain Fo/8;
received cell processing;
transmitted cell processing, with cells being transmitted in cell and byte phase with the receive cells; and
access to the two-port memory M.

The numerical values given above have been given purely by way of non-limiting example, particularly with respect to the sizes of the cell, which sizes will naturally be adapted to the appropriate standards once the standards themselves have been defined.

I claim:

1. Apparatus for processing signalling messages in an asynchronous time division telecommunications network in which information of all kinds is interchanged by means of cells using a communications protocol adapted to asynchronous time division, each cell being preceded by a header which includes a virtual circuit number, said signalling messages being interchanged between control stations connected to the telecommunications network and being exploited within control stations, wherein the apparatus is implanted in each control station for connecting the station to the telecommunications network, wherein it includes a first processor connected to the telecommunications network, a memory, a transmit control memory, a receive control memory, a data bus connected to the first processor, to the memory, and to the control memories, an address bus connected to the first processor and to the memory, and a third bus connected to the memory, to the control memories, and to a second processor situated within said station and exploiting said messages, and wherein the first processor performs the following: detecting transmission errors cell-by-cell, detecting lost or added cells, splitting up a signalling message from the higher level processor into cells, and de-interlacing cells on reception belonging to a plurality of different signalling messages.

2. Apparatus according to claim 1, wherein the memory comprises a transmit memory and a receive memory, wherein the transmit memory comprises a first transmit zone and a second transmit zone for storing the messages to be transmitted as delivered by the second processor, first and second memory words associated with the first and second transmit zones, each including an end-of-message flag sent by the first processor at the ends of messages transmitted or read by the latter, and a transmit context portion having one transmit context per virtual circuit processed by the first processor, each transmit context specifying a number of a cell to be transmitted and acting as a transmitted cell counter, and wherein the receive memory comprises a data portion constituted by information zones each corresponding to an information field of a cell, by a descriptor portion having as many descriptors as there are information zones, each descriptor having a first flag specifying the state of the corresponding information zone, a second flag for indicating whether the zone contains the beginning of a message, a third flag for indicating whether the zone contains the end of the message, and also giving the number of information bytes stored in the said zone and the number of the virtual circuit over which the contents of the zone was received, a clock counter register, a third memory word having an overflow flag, and a receive context portion having one receive context per virtual circuit processed by the processor circuit, each receive context giving the address of a descriptor corresponding to a zone containing the beginning of a message, and giving a next expected cell number, and having a fourth flag for specifying that a message comprising a plurality of cells is in the process of being received over the virtual circuit corresponding to said receive context.

3. Apparatus according to claim 2, wherein the transmit control memory is of the FIFO type, written to by the second processor and read from by the first processor, the higher level processor delivering a transmit command for each message to be transmitted, the transmit command indicating the transmit zone in which the message is stored, the number of bytes in said message, and the number of the virtual circuit over which said message is to be transmitted.

4. Apparatus according to claim 3, wherein the receive control memory is of the FIFO type, written to by the first processor and read from by the second processor, the first processor delivering, for each receive message, a receive command indicating an information zone number in the receive memory containing the beginning of a message, and the time at which said command was delivered.

5. Apparatus according to claim 1, wherein in order to detect transmission errors cell-by-cell, each cell includes a cyclic redundancy check indication performed over the entire cell.

6. Apparatus according to claim 1, wherein the memory is a two-port memory.

* * * * *